C. B. GRAY.
MECHANISM FOR TRANSMITTING MOTION.
APPLICATION FILED APR. 22, 1918.
1,383,619.
Patented July 5, 1921.
5 SHEETS—SHEET 4.
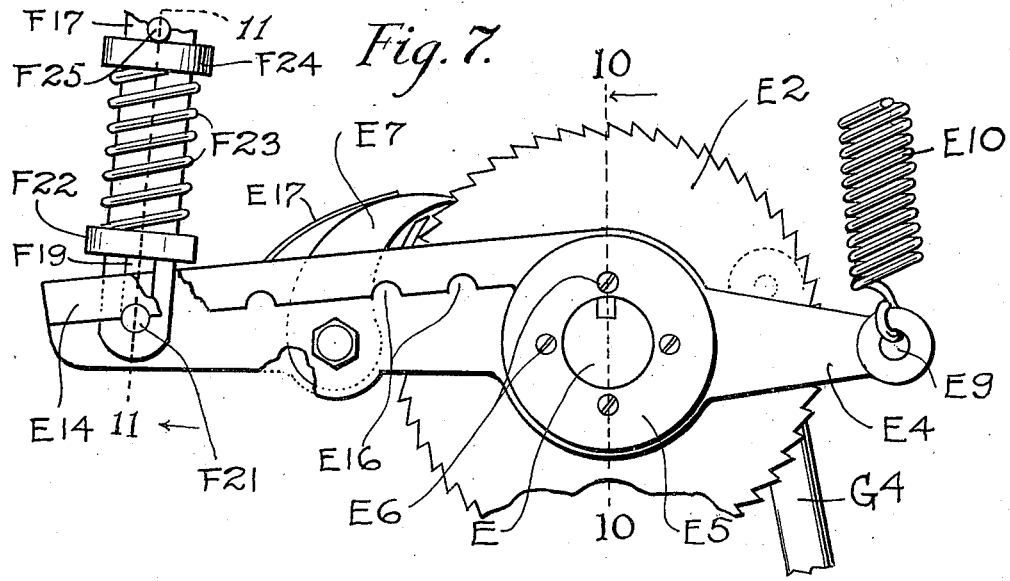
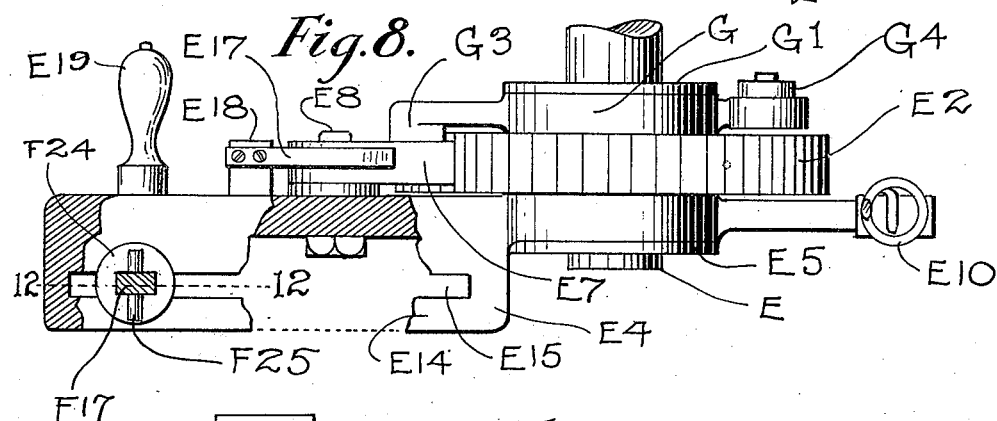
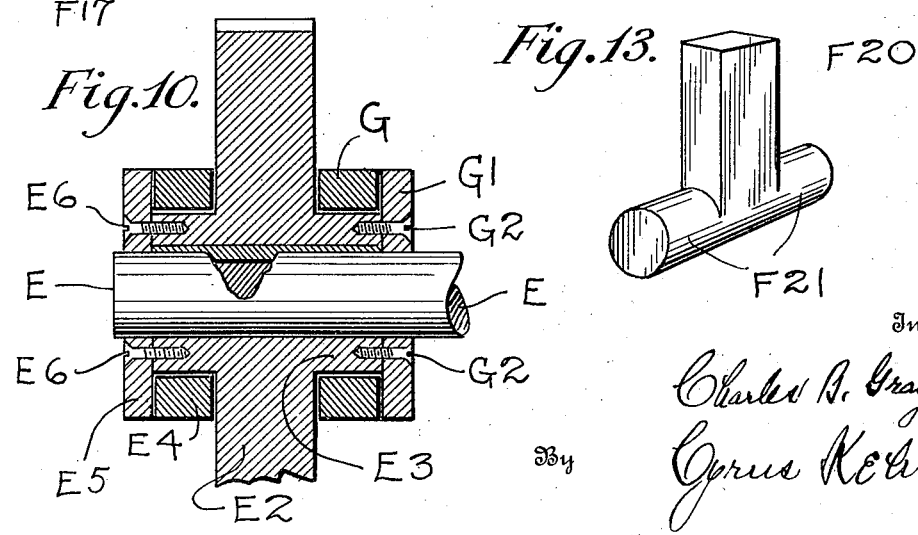
Inventor
Charles B. Gray
By Cyrus Kehr
Attorney

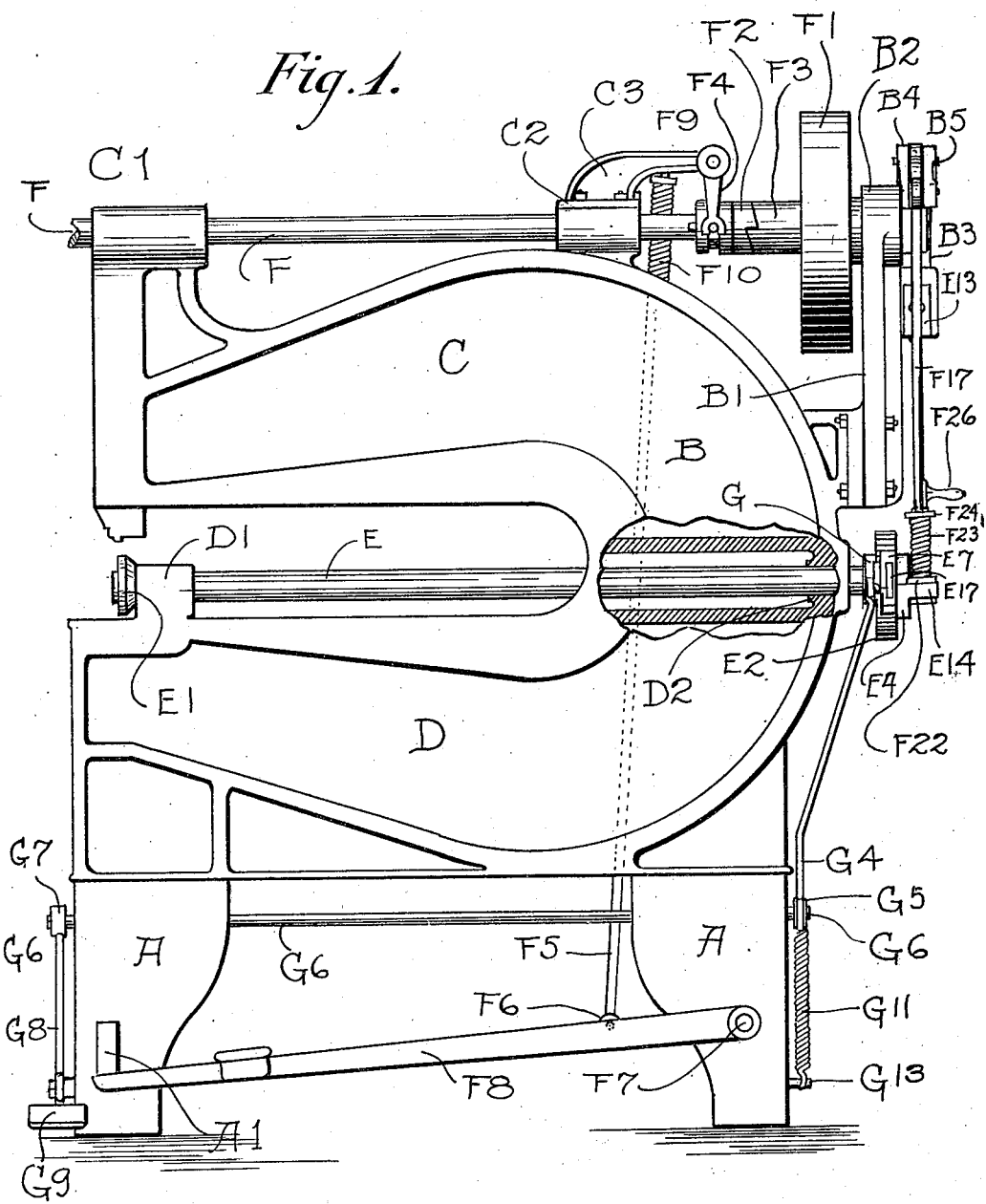

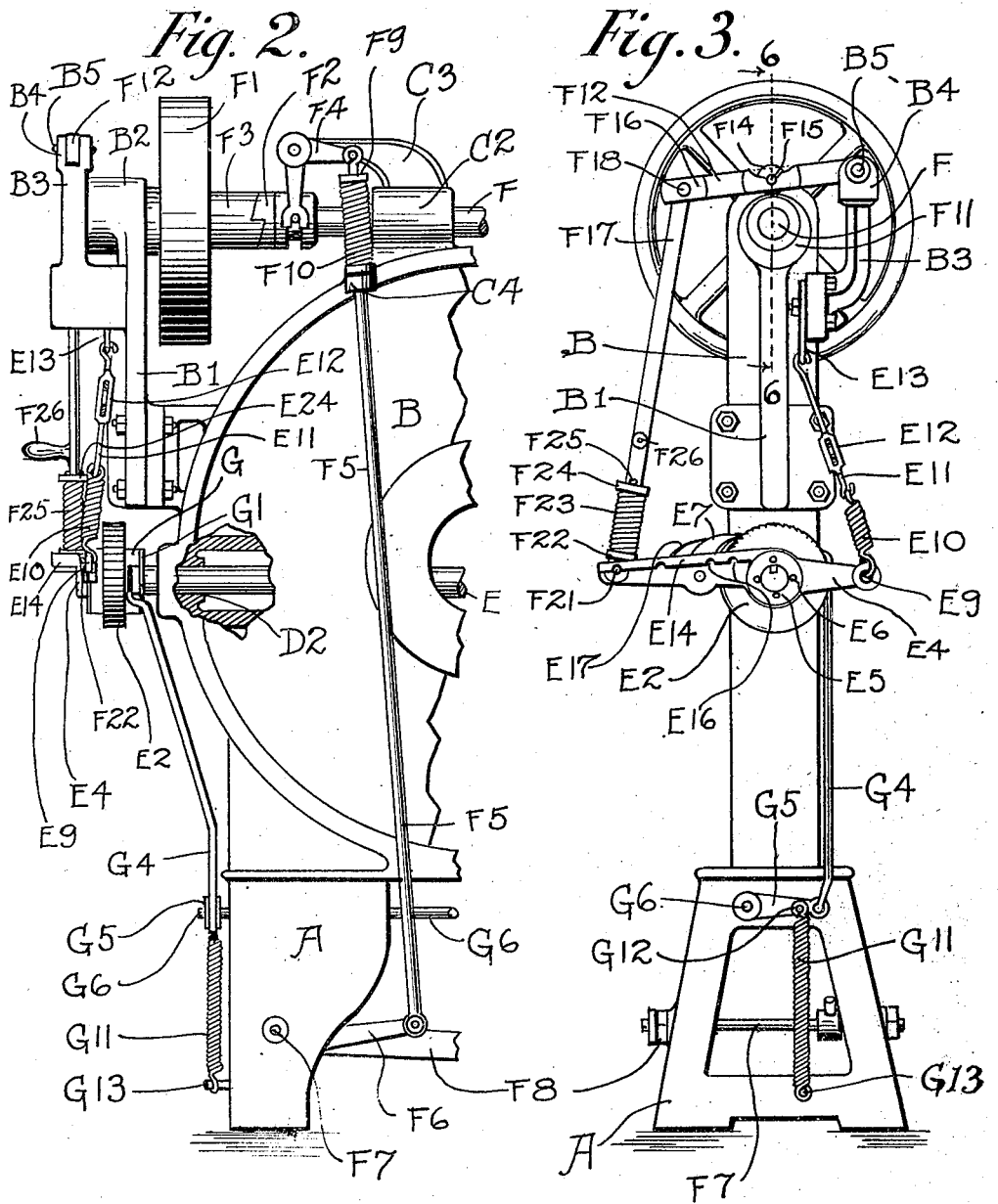

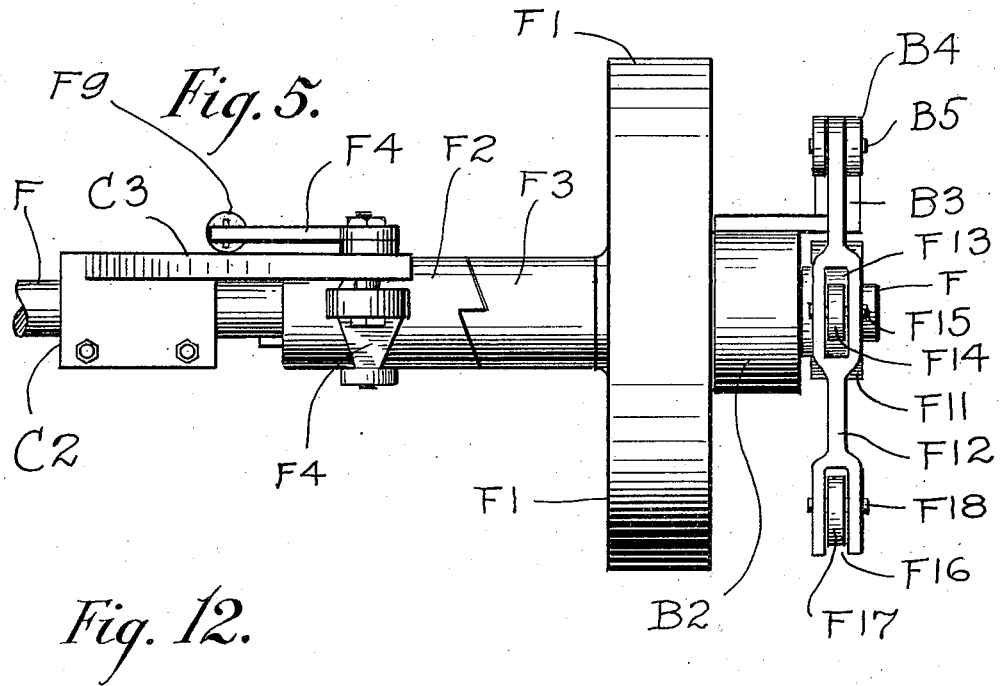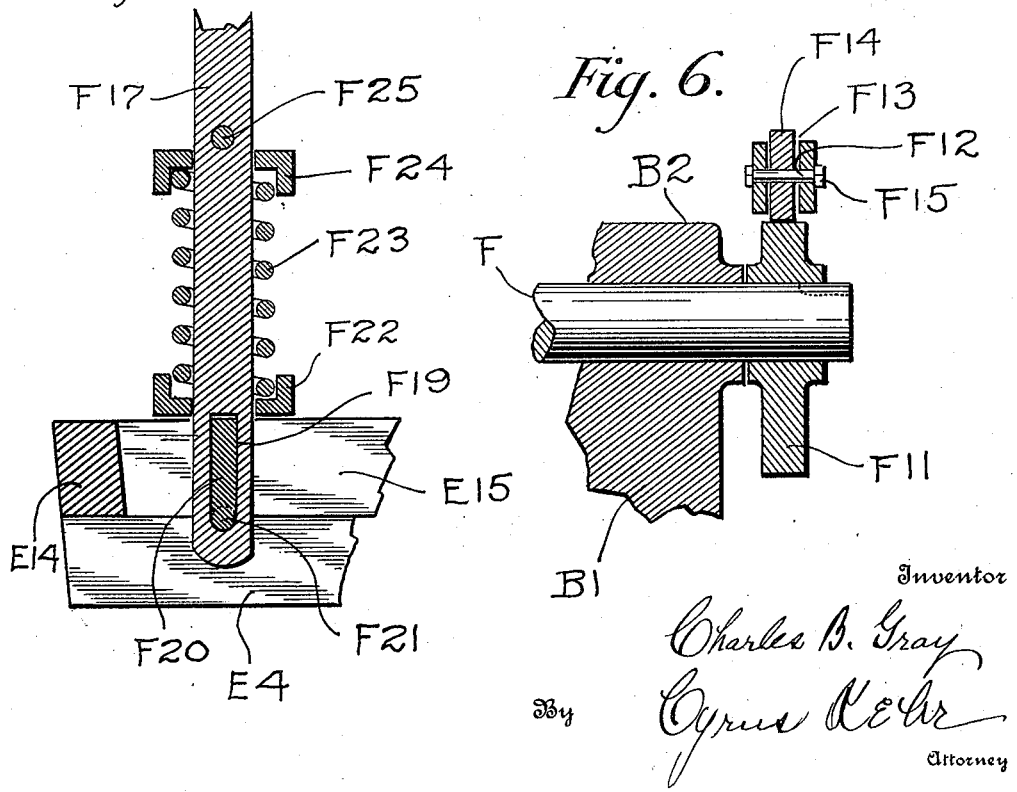

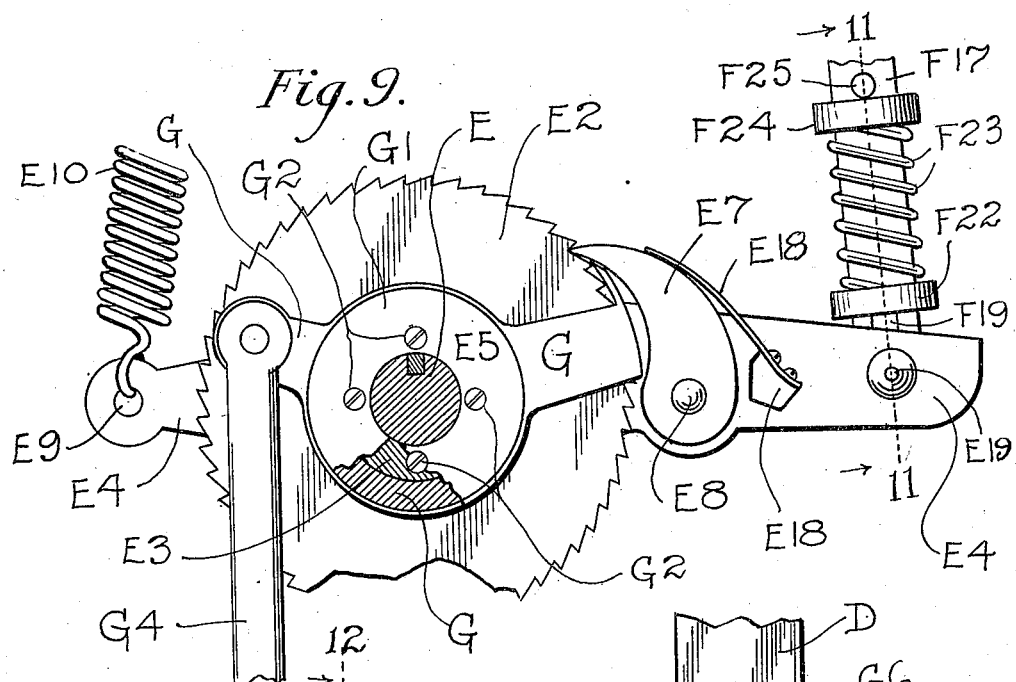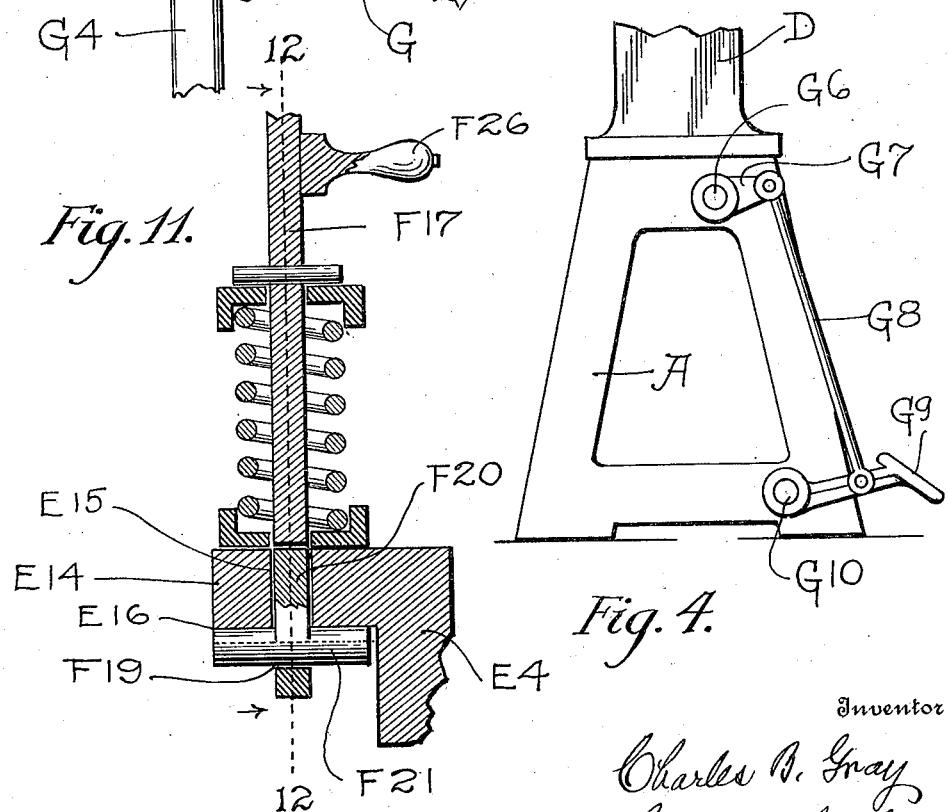

UNITED STATES PATENT OFFICE.

CHARLES B. GRAY, OF PHILADELPHIA, PENNSYLVANIA.

MECHANISM FOR TRANSMITTING MOTION.

1,383,619. Specification of Letters Patent. Patented July 5, 1921.

Application filed April 22, 1918. Serial No. 230,144.

*To all whom it may concern:*

Be it known that I, CHARLES BAXTER GRAY, a citizen of the United States, residing at Philadelphia, in the county of Philadelphia and State of Pennsylvania, have invented a new and useful Improvement in Mechanism for Transmitting Motion, of which the following is a specification, reference being had to the accompanying drawing.

My improvement relates particularly to mechanism comprising a shaft having relatively continuous rotation and a second shaft to which a step-by-step rotation is imparted through means actuated by the first-mentioned shaft.

The object of the invention is to provide such a mechanism adapted to durability and efficiency under high speed operation and to easy control by the operator for variation, suspension, and resumption of the transmission.

For examples of machines to which my improved mechanism is applicable, reference is made to Letters Patent of the United States, No. 1,098,376 and No. 1,098,377, granted to me June 2, 1914, the first for a "machine for cutting sheet metal" and the second for a "machine for cutting sheet form material." For convenience, my improved mechanism will be described as applied to a machine of that type.

In the accompanying drawings,

Figure 1 is a front elevation of a machine embodying my improvement;

Fig. 2 is a rear elevation of the right hand part of the machine shown by Fig. 1;

Fig. 3 is an elevation of the right hand end of the machine;

Fig. 4 is an elevation of the lower part of the left hand end of the machine;

Fig. 5 is a plan of the part of the machine shown by Fig. 2;

Fig. 6 is an upright section on the line, 6—6, of Fig. 3, looking toward the right;

Fig. 7 is a detail elevation of a ratchet mechanism shown at the middle of Fig. 3;

Fig. 8 is a plan of the mechanism shown by Fig. 7, portions of the mechanism being broken away;

Fig. 9 is an elevation of the mechanism shown by Fig. 7, looking from the opposite direction;

Fig. 10 is an upright section on the line, 10—10, of Fig. 7, looking toward the left;

Fig. 11 is a section on the line 11—11, of Figs. 7 and 9, looking toward the left;

Fig. 12 is an upright section on the line, 12—12, of Fig. 11;

Fig. 13 is a perspective of a key block.

Referring to said drawings, A, A, are feet. B is a "head" supported by the feet. This "head" resembles the "head" of a sewing machine, and it comprises a base, D, and an arm, C, between which sheets to be cut are passed, as described in said patents.

Bearings, $D^1$ and $D^2$, support a horizontal rotary shaft, E, which supports the lower feed roller, $E^1$. On the body, B, is an upper shaft, F, which is parallel to the shaft, E, and rests in bearings, $C^1$, $C^2$ and $B^2$. The shaft, F, is connected with a reciprocatory cutter (not shown) as described in said patents. At the right of the bearing, $C^2$, a pulley, $F^1$, loosely surrounds the shaft, F. Between said pulley and said bearing, a clutch member, $F^2$, surrounds and is keyed to said shaft and adapted to engage a companion clutch member, $F^3$, formed on the hub of said pulley. On a bracket, $C^3$, formed on the bearing, $C^2$, is a bell-crank, $F^4$, one arm of which engages the clutch member, $F^2$, for shifting said member toward and from the pulley, $F^1$. The other arm of said bell-crank extends horizontally away from said pulley and is coupled to the upper end of a connecting rod, $F^5$, which has its lower end coupled to an arm, $F^6$, which is mounted on a rock shaft, $F^7$, having bearings in the right hand foot, A, on a horizontal axis. To said shaft, $F^7$, is attached rigidly a pedal arm, $F^8$, which is parallel to the front of the machine. On the left hand foot, A, is a retaining projection, $A^1$, under which the arm, $F^8$, is engaged when in its lower position, the position occupied when the clutch is closed.

At the upper part of the head, B, is a lateral fixed bracket, $C^4$, through which the connecting rod, $F^5$, extends slidably. At the upper end, said rod is surrounded by a cap, $F^9$. Between said cap and the bracket, $C^4$, said rod is surrounded by an expanding coiled spring, $F^{10}$, which forces said cap and said rod upward when the pedal arm, $F^8$, is free. Depressing the pedal arm causes the downward movement of the connecting rod against the action of said spring. Such downward movement causes the rocking of the bell-crank whereby the clutch member, $F^2$, is moved into engagement with the clutch member, $F^3$. When these two clutch members are in engagement with each other, rotation of the pulley, $F^1$, will cause the rotation of the shaft, F, continuously. The shaft, E, is to turn intermittently, each movement being through only a small fraction of a complete rotation, in order that the feed wheel, $E^1$, on said shaft may be given a step-by-step rotation, the upper part of said wheel, the part making contact with the sheet of material to be cut, moving only as far as the sheet is to be advanced between strokes of the reciprocatory cutter. Such intermittent and limited motion is transmitted to the shaft, E, from the shaft, F, by mechanism which will next be described.

The right hand ends of the shafts, E and F, extend equally far to the right. A ratchet wheel, $E^2$, surrounds and is keyed to the shaft, E, near its right hand end. The teeth on said wheel occupy a radial angle corresponding to the smallest radial angle through which the wheel, $E^1$, is to be turned for feeding the sheet. Said ratchet wheel, has a hub, $E^3$. A rocking member, $E^4$, is journaled on the outer end of the hub, $E^3$. A retaining plate, $E^5$, surrounds the shaft, E, and extends over the end of said hub and the adjacent part of the rocking member and is secured to the hub by screws, $E^6$, and retains the rocking member on the hub, $E^3$. On the left hand side of the rocking member is a pawl, $E^7$, journaled on the horizontal stud, $E^8$. Said pawl is directed toward the upper part of the ratchet wheel and makes engagement with the teeth of the wheel when the forward end of the rocking member moves upward. At the rear end of the rocking member is an eye, $E^9$, to which is coupled a contracting coiled spring, $E^{10}$. Said spring extends upward and is coupled to a rod, $E^{11}$, on which is a turn-buckle, $E^{12}$. The upper end of said rod is coupled to a bracket, $E^{13}$, which is fixed on the standard, $B^1$. When the rocking member has been tilted to move the pawl upward, the spring, $E^{10}$, tends to turn the rocking member in the opposite direction and does so as soon as the lifting means stops its lifting effort.

On the end of the shaft, F, is a cam, $F^{11}$, which is so formed as to cause the forward movement of the pawl, $E^7$, while the reciprocatory cutter actuated by the shaft, F, is above the sheet which is to be cut. At the rear of the standard, $B^1$, and opposite the cam is a bracket, $B^3$, rising a little higher than the cam. A lever, $F^{12}$, extends into a fork, $B^4$, on the upper end of the bracket, $B^3$, and is there journaled on a horizontal axle, $B^5$. Said lever extends thence forward across said cam. Above said cam said lever has an upright slot, $F^{13}$, in which is a roller, $F^{14}$, supported on a horizontal axle, $F^{15}$. Said roller rests upon the cam, $F^{11}$, and turns idly and ascends and descends when the cam is turned. Forward of said roller, the arm, $F^{12}$, has a fork, $F^{16}$. The upper end of a connecting rod, $F^{17}$, extends into said fork and is there coupled to the arm, $F^{12}$, by a cross pin, $F^{18}$. The lower end of said rod is coupled to the rocking member, $E^4$, forward of the shaft, E. It will now be seen that the connecting rod, $F^{17}$, will be lifted when the forward end of the lever, $F^{12}$, is lifted and that the lifting of the connecting rod will lift the forward part of the rocking member, $E^4$, the forward ends of the rocking member and the lever, $F^{12}$, moving upward in unison. The cam, $F^{11}$, has only one extension, and thereby provides for the lifting of the lever, $F^{12}$, once during each rotation of the shaft, F. It has already been stated that the shaft, F, rotates continuously (while the clutch members, $F^2$ and $F^3$, are in engagement), and therefore the cam will have constant rotation. Provision is made for varying the distance of the connection between the connecting bar, $F^{17}$, and the rocking member, $E^4$, from the shaft, E. Such variation in coupling varies the lift of the forward end of the rocking member, whereby the bodily lift of the forward end of the pawl, $E^7$, is varied. The outermost position of the coupling of the connecting rod to the rocking member is to be adapted to cause the pawl to be moved through one tooth space. The next position of the coupling is to be so located as to effect the movement of the pawl through two tooth spaces; and so on with other positions of the coupling.

The drawings show a construction which permits easily shifting this coupling by the operator while the machine is in operation. The rocking member has a lateral extension, $E^{14}$, in which is an upright slot, $E^{15}$, extending at right angles to the shaft, E. The walls of the rail slot form a slideway for the connecting rod. In the lower face of said extension, and at opposite sides of said slot are notches, $E^{16}$. The lower end of the connecting bar, $F^{17}$, extends into the slot, $E^{15}$, and within said slot, said bar has an upright slot, $F^{19}$, in which is a key-block, $F^{20}$, which is upright and fills said slot and has lateral arms or journals, $F^{21}$, each extending into a notch, $E^{16}$. Immediately above the rocking member, $E^4$, the connecting bar, $F^{17}$, is surrounded by a retaining plate, $F^{22}$. An expanding coiled spring, $F^{23}$, surrounds said bar and rests on said plate. Above said spring is a retaining plate, $F^{24}$, bearing downward upon said spring, and above said plate a cross pin, $F^{25}$, extends through the connecting bar and prevents the plate, $F^{24}$, from rising. The upward pressure of the spring constantly presses the plate, $F^{24}$, against said cross pin, whereby the connecting bar tends to move upward out of the slot, $F^{19}$, thus holding the arms or journals, $F^{21}$, in the notches, $E^{16}$. But the operator may force the connecting bar downward, against the action of the spring until the journals, $F^{21}$, are out of the notches and then shift the lower end of the bar horizontally in the slot, $E^{15}$, until the journals, $F^{21}$, engage in another pair of notches, whereby the lift of the pawl, $E^7$, is changed. The key-block, $F^{20}$, is to be inserted in the slot, $F^{19}$, when the connecting bar is below its normal position and before the cross pin, $F^{25}$, is inserted. After said cross pin has been inserted, the key block, $F^{20}$, remains in position indefinitely, the downward movement for disengaging the arms, $F^{21}$, from the notches, $E^{16}$, being insufficient to allow said block to move sidewise out of the slot, $F^{19}$, of the connecting bar. It will be observed that the several parts concerned with the forming of this shiftable coupling are simple and easily manufactured and that the shifting of the coupling is an easy operation. For convenience, a handle, $E^{19}$, is placed on the forward end of the rocking member, $E^4$, and a handle, $F^{26}$, is placed on the connecting bar above the cross pin, $F^{25}$. These handles may be grasped by the operator and upward force exerted upon the lower handle and downward and forward or backward force exerted on the upper handle.

A blade spring, $E^{17}$, is secured by one end to a seat, $E^{18}$, on the rocking member, $E^4$, while its other end bears yieldingly upon the pawl, $E^7$, to cause said pawl to bear yieldingly upon the periphery of the ratchet wheel, $E^2$.

The apparatus also embodies means controlled by the operator by which the free end of the pawl is normally forced away from the ratchet wheel, so that while the rocking member, $E^4$, is being actuated and the pawl thereby moved upward and downward, the ratchet wheel will remain at rest.

A rocker, G, surrounds the hub, $E^3$, at the left of the ratchet wheel, and a retaining plate, $G^1$, surrounds the shaft, E, and extends over the end of said hub and the adjacent part of said rocker and is secured to the hub by screws, $G^2$, extending through said plate into the hub. Forward of said hub, said rocker has a finger, $G^3$, extending laterally over the perimeter of the ratchet wheel and normally resting below the free end of the pawl and between the pawl and the ratchet wheel so as not to interfere with the movements of the pawl during the rocking of the member, $E^4$. But the several parts are so proportioned as that when the rocking member, G, is turned on the hub, $E^3$, to lift the finger, $G^3$, said finger will move upward and push the pawl outward. Said finger is extended sufficiently to retain engagement with the point of the pawl during the reciprocations of the latter resulting from the rocking of the rocking member, $E^4$. It will be observed that, since the rocking member, G, is journaled on the hub, $E^3$, said rocking member and the ratchet wheel have a common axis, and therefore the finger, $G^3$, moves in a path which is parallel to the periphery of the ratchet wheel and that said finger may be set close to the ratchet teeth and that that distance will not change during the movements of said finger. At the rear end of the rocking member, G, the upper end of the connecting rod, $G^4$, is coupled to said rocking member. The lower end of said rod is coupled to an arm, $G^5$, on a rock shaft, $G^6$, which is horizontal and parallel to the front of the machine and has bearings in the feet, A, A, and has its ends projecting beyond said feet. At its left hand end, an arm, $G^7$, is rigid on said shaft. The upper end of a connecting rod, $G^8$, is coupled to said arm, while the lower end of said rod is coupled to a pedal, $G^9$, which is hinged on a horizontal stud, $G^{10}$, on the left hand face of the foot, A.

The arm, $G^5$, extends rearward and the arm, $G^7$, extends forward on the rock shaft, $G^6$. Hence depressing the pedal, $G^9$, will cause the upward movement of the arm, $G^5$, and the connecting rod, $G^4$, whereby the rocking member, G, is tilted to move the finger, $G^3$, downward out of its position between the ratchet wheel and the pawl, $E^7$, to allow the pawl to engage the ratchet teeth. To move the rod, $G^4$, and the parts connected therewith in the opposite direction, a spring, $G^{11}$, has its upper end connected to a stud, $G^{12}$, on said rod while its lower end is connected to a stud, $G^{13}$, on the adjacent foot, A.

Under this arrangement of this part of the apparatus, the finger normally holds the pawl out of engagement with the ratchet wheel, and the shaft, E, is given its partial rotations for the turning of the feed wheel, $E^1$, only when the operator is depressing the pedal, $G^9$, the feed of the sheet stopping automatically when the operator releases the pedal.

The rocking member, $E^4$, and the arm, $F^{12}$, are arranged to prevent lost motion, play or pounding. The spring, $E^{10}$, constantly pulls upward on the rear end of the member $E^4$. Consequently the forward end of said member constantly pulls downward on the connecting bar, $F^{17}$, whereby the forward end of the lever, $F^{12}$, is constantly under downward strain, whereby the roller, $F^{14}$, is constantly held against the cam, $F^{11}$. But the elasticity of the spring, $E^{10}$, makes this engagement yielding. Hence all the joints involved in this part of the structure are held under sufficient strain to prevent rattling, and, although the shaft is rotated at high speed, pounding of the roller, $F^{14}$, on the cam, $F^{11}$, is avoided. Furthermore, the spring, $F^{23}$, through its constant endwise pressure against the plates, $F^{22}$, and $F^{24}$, prevents lost motion and rattling at the connection between the bar, $F^{17}$, and the rocking member, $E^4$, although said connection is so free as to allow ready shifting by the operator, while the machine is in motion, for the purpose of varying the travel of the pawl, $E^7$.

I claim as my invention,

1. In a mechanism for transmitting motion, the combination of a reciprocable member and a connecting bar, the connecting bar and the reciprocable member being formed for inter-engagement at chosen places along the length of the reciprocable member, and yielding means acting in the direction of the connecting bar and tending to maintain said engagement, substantially as described.

2. In a mechanism for transmitting motion, the combination of a reciprocable member having notches at one side, a connecting bar located at the opposite side of said reciprocable member in operative relation with said notches, and a spring tending to draw the connecting bar away from the reciprocable member, whereby yielding engagement in said notches is made, substantially as described.

3. In a mechanism for transmitting motion, the combination of a longitudinally slotted and notched reciprocable member, a connecting bar having one end in operative relation with said reciprocable member for engagement in the notches of the reciprocable member, and a spring acting on the connecting bar in the direction of the length of the latter, substantially as described.

4. In a mechanism for transmitting motion, the combination of a slotted and notched reciprocable member, a connecting bar having one end in operative relation with said reciprocable member for engagement in the notches of the reciprocable member, and a spring tending to move the connecting bar away from the reciprocable member, substantially as described.

5. In a mechanism for transmitting motion, the combination of a slotted and notched reciprocable member, a connecting bar, a journal member in operative relation with the connecting bar and adapted to engage in the notches of the reciprocable member, and a spring tending to move the connecting bar away from the reciprocable member, substantially as described.

6. In a mechanism for transmitting motion, the combination of a notched reciprocable member, a connecting bar having a slot in one end, a key member adapted to engage in said slot and in the notches of the reciprocable member, and a spring tending to move the connecting bar away from the reciprocable member, substantially as described.

7. In a mechanism for transmitting motion, the combination of a first shaft and a second shaft, a slotted reciprocable member, means placing the reciprocable member in operative relation with the second shaft for imparting motion intermittently to the second shaft, a connecting bar having one end slotted, a shiftable key member engaging the rocking member and the slotted part of the connecting bar, and means placing the other end of the connecting bar into operative relation with the first shaft, substantially as described.

8. In a mechanism for transmitting motion, the combination of a first shaft and a second shaft, a ratchet wheel on the second of said shafts, a slotted pawl-support hinged on the axial line of the second shaft, a pawl on said support in position to engage the teeth of said ratchet wheel, a connecting bar having one end slotted, a key member engaging the rocking member and the slotted part of the connecting bar, and means placing the other end of the connecting bar into operative relation with the first shaft, substantially as described.

9. In a mechanism for transmitting motion, the combination of a first shaft and a second shaft, a slotted reciprocable member, means placing the reciprocable member in operative relation with the second shaft for imparting motion intermittently to the second shaft, a connecting bar having one end slotted, a shiftable key member engaging the rocking member and the slotted part of the connecting bar, a spring tending to move the connecting bar away from the reciprocable member, and means placing the other end of the connecting bar into operative relation with the first shaft, substantially as described.

10. In a mechanism for transmitting motion, the combination of a first shaft and a second shaft, a ratchet wheel on the second of said shafts, a slotted pawl-support hinged on the axial line of the second shaft, a pawl on said support in position to engage the teeth of said ratchet wheel, a connecting bar having one end slotted, a key member engaging the rocking member and the slotted part of the connecting bar, a spring tending to move the connecting bar away from the pawl-support, and means placing the other end of the connecting bar into operative relation with the first-mentioned shaft, substantially as described.

11. In a mechanism for transmitting motion, the combination of a first shaft and a second shaft, a slotted and notched reciprocable member, means placing the reciprocable member in operative relation with the second shaft for imparting motion intermittently to the second shaft, a connecting bar having one end slotted, a shiftable key member engaging the rocking member and the slotted part of the connecting bar and the notches of said bar, and means placing the other end of the connecting bar into operative relation with the first shaft, substantially as described.

12. In a mechanism for transmitting motion, the combination of a first shaft and a second shaft, a ratchet wheel on the second of said shafts, a slotted and notched pawl-support hinged on the axial line of the second shaft, a pawl on said support in position to engage the teeth of said ratchet wheel, a connecting bar having one end slotted, a key member engaging the rocking member and the slotted part of the connecting bar and the notches of said bar, and means placing the other end of the connecting bar into operative relation with the first-mentioned shaft to receive motion from said shaft, substantially as described.

13. In a mechanism for transmitting motion, the combination of two shafts, a cam on one of said shafts, a ratchet wheel on the other of said shafts, a slotted pawl-support hinged on the axial line of the second shaft, a pawl on said support in position to engage the teeth of said ratchet wheel, a connecting bar having one end slotted, a key member engaging the rocking member and the slotted part of the connecting bar, means placing the upper end of the connecting bar into operative relation with said cam, and a spring tending to move the connecting bar endwise away from the rocking member, substantially as described.

14. In a mechanism for transmitting motion, the combination of two shafts, a cam on one of said shafts, a ratchet wheel on the other of said shafts, a slotted pawl-support hinged on the axial line of the second shaft, a pawl on said support in position to engage the teeth of said ratchet wheel, a connecting bar having one end slotted, a key member comprising journals engaging the rocking member and the slotted part of the connecting bar, means placing the upper end of the connecting bar into operative relation with said cam, and a spring tending to move the connecting bar endwise away from the rocking member, substantially as described.

15. In a mechanism for transmitting motion, the combination of two rotary shafts, a cam on one of said shafts, a ratchet wheel on the other of said shafts, a pawl-support near the second shaft, a pawl on said support in position to engage the teeth of said ratchet wheel, a connecting member in operative relation with said support and said cam to reciprocate said pawl-support during the rotation of said cam, a shiftable finger support having a finger adapted to extend into engagement with said pawl and hold the latter away from the ratchet wheel, automatic means for normally holding said finger support in one of its positions, and means controlled by the operator for holding said finger support in its other position, substantially as described.

16. In a mechanism for transmitting motion, the combination of two rotary shafts, a cam on one of said shafts, a ratchet wheel on the other of said shafts, a pawl-support near the second shaft, a pawl on said support in position to engage the teeth of said ratchet wheel, a connecting member in operative relation with said support and said cam to reciprocate said pawl-support during the rotation of said cam, a shiftable finger support having a finger adapted to extend into engagement with said pawl and hold the latter away from the ratchet wheel, means for normally holding said finger support in position to so keep said finger in engagement with said pawl, and means controlled by the operator for turning said finger support to bring said finger out of engagement with said pawl to permit the latter to act upon the ratchet wheel, substantially as described.

17. In a mechanism for transmitting motion, the combination of a rotatable shaft, a ratchet wheel comprising a hub and being secured immovably on said shaft, a rocking member mounted on said hub, a pawl on said rocking member, means for rocking said rocking member, a second rocking member mounted on said hub, operator-controlled means on said second rocking member for normally holding said pawl away from said ratchet wheel during the forward movement of the pawl, and means for rocking said rocking member, substantially as described.

In testimony whereof I have signed my name this 20th day of April, in the year one thousand nine hundred and eighteen.

CHARLES B. GRAY.